United States Patent Office 3,660,507
Patented May 2, 1972

---

3,660,507
CONVERSION OF OLEFINS
Robert E. Reusser, Bartlesville, Okla., assignor to
Phillips Petroleum Company
No Drawing. Continuation of application Ser. No.
627,669, Apr. 3, 1967. This application Jan. 12,
1970, Ser. No. 1,969
Int. Cl. C07c 3/10
U.S. Cl. 260—666 A 11 Claims

ABSTRACT OF THE DISCLOSURE

Olefins are converted into other olefins having different molecular weights by contact with a catalyst active for disproportionating propylene into ethylene and butene and with magnesium oxide which has been treated with carbon monoxide, nitric oxide, hydrogen or an olefinic or a paraffinic hydrocarbon at elevated temperature.

---

This application is a continuation of application Ser. No. 627,669, filed Apr. 3, 1967, now abandoned.

This invention relates to the olefin reaction for conversion of olefin hydrocarbons to other hydrocarbons in the presence of a catalyst active for disproportionating propylene into ethylene and butene. In one aspect it relates to a method for rendering a solid catalytic material more active for the olefin reaction. In still another aspect it relates to a catalyst system and to a treatment therefor for the olefin reaction process.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention includes at least the following reactions:

(1) The disproportionation of an acyclic mono- or polyene having at least three carbon atoms into other mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene plus 4-methylpentene-2 yields 3-methylbutene-1 and propylene;

(4) The conversion of ethylene or an acyclic mono- or polyene having three or more carbon atoms with a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least 7 carbon atoms and having at least 5 carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

Magnesium oxide has shown little activity for the olefin reaction conversion process either as a catalyst per se or as a support for promoting compounds such as oxides of molybdenum, tungsten, rhenium, and the like. I have now found, however, that magnesium oxide, when treated with carbon monoxide, hydrogen, or a paraffinic or an olefinic hydrocarbon, at elevated temperature in the range of about 800–1400° F., for about 1 minute to 30 hours, and used in conjunction with an olefin reaction catalyst, active for disproportionating propylene, exerts an unexpectedly beneficial effect on the conversion in the olefin reaction process.

It is an object of this invention to provide an improved catalyst system for the conversion of olefin hydrocarbons by the olefin reaction process. It is also an object of this invention to provide a method for treating magnesium oxide so that the treated magnesium oxide, when used in conjunction with an olefin disproportionation catalyst, provides an improvement in the conversion of olefin hydrocarbons in the olefin reaction process. Still another object of this invention is to provide a method for increasing the conversion of olefin hydrocarbons in the olefin reaction process. Other objects, aspects and advantages of this invention will be apparent to one skilled in the art upon studying the disclosure, including the detailed description of the invention.

Broadly, the invention contemplates contacting an olefin hydrocarbon with magnesium oxide and with an olefin reaction catalyst, active for disproportionating propylene, where the magnesium oxide has been treated with carbon monoxide, intric oxide, hydrogen, or a paraffinic or an olefinic hydrocarbon at elevated temperature prior to use in the olefin reaction process. Both the magnesium oxide and the olefin reaction catalyst can be treated with the CO, NO, $H_2$ or hydrocarbon.

The magnesium oxide, sometimes referred to as magnesia, applicable for use in this invention, can be any conventional catalytic grade or activated magnesium oxide prepared by any conventional technique. Thus, it can be prepared synthetically or derived from a naturally occurring mineral, such as Brucite. It can range in form from fine powder to coarse granules. The finished catalyst, after calcination and treatment with the treating gas, can also be in the form of powder or granules, as well as in other shapes such as agglomerates, pellets, spheres, extrudates, beads, and the like, depending upon the type of contacting technique which utilizes the catalyst. The magnesia should have a surface area of at least about 1 square meter per gram. Before use in the process, the magnesium oxide is calcined, for example, by heating in a flowing stream of an oxygen-containing gas for about 1 to about 30 hours at about 500–1500° F., preferably at about 600–1000° F.

After calcination, the magnesia is given the treatment with the carbon monoxide, hydrogen or hydrocarbon at a temperature in the range of about 800–1400° F., preferably about 900–1200° F., for a period of time ranging from about 1 minute to 30 hours. Flushing the magnesium oxide with an inert gas before and after the treatment with the treating gas is advisable although not essential. Regeneration and activation of the spent magnesium oxide is generally accomplished by repeating the above-described air-activation and gas treatment steps and can be carried out simultaneously with the regeneration and activation of the olefin reaction catalyst with which it is being utilized.

Any paraffinic or olefinic hydrocarbon that is a vapor at the treating conditions can be utilized in treating the magnesium oxide. Specific hydrocarbons include methane, ethane, ethylene, propane, propylene, butanes, butenes, pentanes, cyclopentane, cyclopentene, pentenes, hexanes, cyclohexane, cyclohexene, hexenes, heptanes, heptenes, octanes, octenes, and the like, and mixtures thereof. The lower hydrocarbons such as methane, propane, and propylene, are preferred.

When the treating gas is a hydrocarbon, such as a gaseous olefin or paraffin, these may be the same, or different, from the gases used as feeds or diluents for the olefin reaction process itself. With these hydrocarbon gases, the treating temperature will generally be in the range of about 925–1200° F., and relatively low pressures, for example, 0 to about 100 p.s.i.g., will be used. The space velocity of the treating gas with regard to the magnesia will be in the range of from about 100 to about 10,000 volumes of gas per volume of catalyst per hour. The treating gases can be diluted, if desired, with other gases such as nitrogen, which are non-deleterious to the catalyst system under the conditions of treatment. When olefins are used as the treating gas, the catalyst treatment conditions will be somewhat higher in temperature, somewhat lower in pressure, and somewhat lower in space velocity than the optimum corresponding conditions for the olefin reaction process.

The preferred olefin reaction catalyst for use in the present invention is tungsten oxide associated with silica but any catalyst which shows activity for the disproportionation of propylene can be used. Some examples of such catalysts are (1) Silica or thoria promoted by an oxide or compound convertible to an oxide by calcination or sulfide of tungsten or molybdenum or by an oxide or compound convertible to an oxide by calcination of rhenium, vanadium, niobium, tellurium or tantalum;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

The catalyst systems of the present invention can comprise a mixed bed containing both magnesium oxide and the appropriate olefin disproportionation catalyst or a series of catalyst zones wherein a zone containing the olefin disproportionation catalyst is preceded by a zone containing the magnesium oxide. Further, a combination of these techniques can be used. That is, a bed of magnesium oxide can precede a mixed bed containing both magnesium oxide and a suitable olefin disproportionation catalyst. When mixed catalyst beds are used, particles of magnesium oxide and particles of the olefin disproportionation catalyst having about the same particle size can simply be blended. Alternatively, both the magnesium oxide and the olefin disproportionation catalyst can be intimately blended, such as by grinding, and the powder then formed into other shapes such as pellets, tablets, agglomerates, extrudates, and the like, such that each particle in the catalytic zone is already an intimate blend of these two materials.

The proportion of magnesium oxide to the olefin reaction or disproportionation catalyst in the mixed bed embodiment can vary widely. At least 0.1 part by weight of magnesium oxide should be present for each part by weight of olefin reaction catalyst by weight but there is actually no upper limit to the amount of magnesium oxide which can be present. Preferred ratios, however, are 0.5 to about 10 parts magnesium oxide per part of olefin reaction catalyst by weight.

When using the mixed bed catalyst embodiment, the conditions for contacting the olefins with this mixed catalyst system and the conditions for regenerating the catalyst system are essentially dictated by the conditions which are applicable for the specific olefin disproportionation catalyst utilized. For example, this may require reaction temperatures of about 325° F. when molybdena on alumina catalysts are used, about 750° F. when tungsten oxide on silica catalysts are employed, and about 1000° F. when molydena on silica catalysts are utilized. It is preferable to mix the magnesium oxide with an olefin disproportionation catalyst which is similarly regenerated, such as an oxide type reaction catalyst. The conversion can be carried out at any convenient pressure up to about 2000 p.s.i.g. or higher, preferably 0 to about 500 p.s.i.g., and at any convenient weight hourly space velocity which can range from about 0.1 to about 1,000. Excellent results have been obtained at weight hourly space velocities in the range of 1 to 200 parts by weight of hydrocarbon feed per part by weight of catalyst per hour. The process can utilize any conventional contacting technique such as fixed bed reactors, fluidized bed reactors, suspended catalyst systems, and the like, utilizing both phase and liquid phase operations.

When using successive catalyst zones, that is, an olefin reaction catalyst zone preceded by a magnesium oxide zone, each zone can be operated under a set of conditions favorable to that specific material. Thus, the operating conditions for the olefin reaction catalyst can be different from those of the magnesium oxide when these materials are maintained in separate zones. In general, the contact of the feed olefin with the magnesium oxide is accomplished at temperatures ranging from about 150 to 1100° F., preferably about 300 to 1000° F. at a convenient pressure and any residence time or through-put rate which will effect the desired degree of conversion. The conditions for the olefin reaction zone can be those which are known to be the optimum for the specific olefin reaction catalyst utilized. When paraffinic or olefinic treating gases are used in the catalyst treating procedure of the present invention, the olefin conversion process is carried out at 150–875° F.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene-2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9 - octadecapentaene, 1,3-eicosadiene, 4-octene, 3-eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

The olefin reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be non-reactive under the conditions of the olefin reaction.

In one important embodiment of the invention, cyclic monoolefins are converted to other cyclic monoolefins having a smaller ring size by contact with the catalyst system in the presence of substantial quantities of ethylene. For example, cyclohexenes can be converted to cyclopentenes in substantial yields by contact with a catalyst system comprising magnesium oxide and silica supported tungsten oxide. The cyclic monoolefins suitable for conversion in this manner are those which contain from 6 to about 30 carbon atoms. The cyclic compounds can be substituted with one or more alkyl groups having about 5 carbon atoms. However, when such substituents are present, the double bond must be isomerizable, that is, it must be able to be shifted at least one position. Excellent results are obtained with cyclic olefins containing up to about 20 carbon atoms per molecule and especially with unsubstituted monoolefins having from about 6 to about 12 carbons atoms. The proportion of ethylene to cyclic monoolefins introduced into the reaction zone generally is in the range of about 2 to about 30 moles of ethylene per mole of cyclic olefin but even greater quantities of ethylene can be utilized, limited only by the ability to separate and recycle the unconverted ethylene conveniently. Generally, ethylene will be present in the reactor effluent. The products which are obtained by this process are cyclic monoolefins having at least one less carbon atom in the ring than in the original starting material. Propylene generally is the major by-product. To insure high yields of such cyclic products, as opposed to larger amounts of lower molecular weight acyclic products, the operating conditions will include a combination of the shortest reaction times, the lowest temperatures, and the highest pressures compatible with the specific catalyst utilized and conversion of the specific cyclic olefins being converted. The effluent of the reaction can be treated conventionally and desired products can be separated by any convenient means, such as by fractional distillation. Unconverted ethylene as well as other olefinic products not in the desired molecular weight range can be recycled where appropriate.

In another important embodiment of this invention, acyclic polyenes or cyclic mono- or polyenes having up to 30 carbon atoms per molecule can be converted to conjugated dienes by contact with a catalyst system of the invention in the presence of substantial quantities of ethylene. When the applicable olefinic materials are converted according to this process, the products obtained, depending upon the feed materials, are 1,3-butadiene, 2-methyl-1,3-butadiene (isoprene), 2,3-dimethyl-1,3-butadiene, isobutene, and propylene. These products are the fundamental products of this reaction which are not converted to lower molecular weight products. Thus, with suitable recycle and separation techniques, the applicable olefinic materials can be exhaustively reduced to one or more of the fundamental products. Unbranched starting olefinic materials can produce 1,3-butadiene while branched olefinic starting materials can produce methyl substituted butadiene. Olefinic materials applicable for use in the present invention are olefins having from 5 to about 30 carbon atoms per molecule including isomerizable acyclic polyenes, and isomerizable cyclic mono- or polyenes. The olefinic materials can be branched or unbranched but the presence of one or more quaternary carbon atoms will, barring skeletal isomerization, reduce the yields of conjugated dienes. The polyolefinic materials can contain from about 2 to about 5 double bonds per molecule and can be either conjugated or non-conjugated. The proportion of ethylene to olefinic feedstocks introduced into the reaction zone will generally range from about 2 to about 30 moles of ethylene per mole of olefinic feedstock but even greater quantities of ethylene can be utilized, limited only by the ability to conveniently separate and recycle the unconverted ethylene. Generally, ethylene should be present in the reactor effluent. When the cyclic olefinic materials are used as feedstocks, preferably the conversion is carried out at relatively high temperatures, at relatively low reaction pressures, and at relatively low space velocities. Thus, increased conversion of such cyclic olefinic materials to conjugated dienes is obtained at reaction temperatures which are preferably above 700° F., at reaction pressures which are generally lower than about 500 p.s.i.g., and at weight hourly space velocities which are generally lower than about 25 w./w./hr., or at other combinations of these conditions which give equivalent results.

In another important embodiment of this invention, acyclic monoolefins having up to about 30 carbon atoms are converted to propylene and isobutene by contact with a catalyst system of this invention in the presence of substantial quantities of ethylene. The proportion of ethylene to cyclic monoolefins introduced into the reaction zone generally is in the range of about 2 to about 30 moles of ethylene per mole of cyclic olefin but even greater quantities of ethylene can be utilized, limited only by the ability to separate and recycle and unconverted ethylene conveniently. When the conversion is carried out according to this process, it is possible to reduce any olefin or mixture of olefins to the fundamental products of the reaction, that is, to the products which can be reduced in molecular weight no further. These fundamental products are generally propylene or isobutene but can be in some instances neohexene or substituted neohexene where the substituent is not on the vinyl group. This process finds particular utility in the removal of olefins from refinery streams from which olefins are not ordinarily separable. The conversion of olefin-containing refinery streams results in the degradation of the higher molecular weight olefins to products such as propylene and isobutene which are readily separable by distillation. Gasoline streams from which the olefins have been removed in this manner have increased value in that they are less objectionable from the standpoint of motor vehicle hydrocarbon emissions. As a further advantage, propylene and isobutene which are removed from the gasoline stream can be converted to high octane value alkylates which can be returned to the gasoline to significantly increase the octane value of the gasoline. Acyclic monoolefins which can be converted according to this process are those isomerizable olefins having from about 4 to about 30 carbon atoms per molecule. They can be branched or unbranched but the presence of one or more quaternary carbon atoms in the molecule will, barring skeletal isomerization, reduce the reactivity of the olefin. The compound 2,4,4-trimethylpentene-2 is readily convertible to isobutene but this is generally the result of strong inclination to crack at elevated temperatures. The proportion of ethylene to the acyclic monoolefins generally is at least 2:1 but there is no theoretical upper limit. However, practical limits, determined by considerations of separation and recycle, generally will be about 20:1. When it is desired to completely convert large molecules, greater quantities of ethylene are required such that an excess of ethylene is always present in the effluent.

The following specific embodiments of the invention will be helpful in attaining an understanding of the invention but should be considered as exemplary of the invention and should not be construed as unduly limiting the invention.

EXAMPLE I

A quantity of a silica-supported tungsten oxide catalyst (containing 6.8 weight percent $WO_3$, having a pore diameter of 114 angstroms, a pore volume of 0.98 cc./g., and a surface area of 345 m.$^2$/g.) was placed in a vertical tubular steel fixed bed reactor. Steel helices were used as packing both above and below the catalytic section. A quantity of 40–70 mesh magnesium oxide (previously pelleted, crushed, screened, and dried at 1000° F.) was placed upstream of the tungsten catalyst and separated therefrom by a layer of asbestos. About 5 parts by weight of magnesium oxide per part by weight of silica-supported tungsten oxide catalyst was utilized. The reactor and contents were heated for 3 hours in flowing air at 1000° F. The reactor was flushed with nitrogen and then treated with flowing carbon monoxide for 30 minutes, also at 1000° F. The reactor was then flushed again with nitrogen.

Heptene-3 was passed downwardly through the above-prepared catalytic zone, that is, passing through the MgO before passing through the $WO_3/SiO_2$, at a weight hourly space velocity of 51.6 w./w./hr. (based on the tungsten catalyst), at a temperature of 700° F. and a pressure of 0 p.s.i.g. (atmospheric pressure). The conversion was 71.3 percent and the effluent, on analysis, was found to contain olefins as shown and in the quantities indicated in the following Table I.

TABLE I

Analysis of effluent of heptene-3 conversion

| Olefin component: | Weight percent |
|---|---|
| $C_2$ | Trace |
| $C_3$ | 0.20 |
| $C_4$ | 2.15 |
| $C_5$ | 7.23 |
| $C_6$ | 15.27 |
| $C_7$ | 28.66 |
| $C_8$ | 22.54 |
| $C_9$ | 14.00 |
| $C_{10}$ | 6.84 |
| $C_{11}$ | 2.15 |
| $C_{12}$ | 0.52 |
| $C_{13}$ | 0.20 |
| $C_{14}$ | 0.13 |

The above data show that heptene-3 was effectively converted and that the primary products of the disproportionation of heptane-3 ($C_6$ and $C_8$) and the primary products of the conversion of heptene-3 and heptene-2 ($C_5$ and $C_9$) are the principal products of the conversion.

EXAMPLE II

One part by weight of the same olefin reaction catalyst described in Example I was pre-mixed with about 3 parts by weight of a dried magnesium oxide (minus 100 mesh) and charged into the same vertical tubular steel reactor. The reactor contents were heated for 3 hours at 1000° F. in flowing air, flushed with nitrogen, heated for an additional 30 minutes in flowing carbon monoxide at the same temperature, and again flushed with nitrogen.

Heptene-3 was passed downwardly through this catalytic section at 700° F. and atmospheric pressure (0 p.s.i.g.)

and at a space rate of 51.6 w./w./hr. The conversion was 79.9 percent and an analysis of the effluent showed the olefins in indicated amounts as shown in the following Table II.

TABLE II

Analysis of effluent of heptene-3 conversion

| Olefin component: | Weight percent |
|---|---|
| $C_2$ | Trace |
| $C_3$ | 0.66 |
| $C_4$ | 4.47 |
| $C_5$ | 9.97 |
| $C_6$ | 19.37 |
| $C_7$ | 20.12 |
| $C_8$ | 18.24 |
| $C_9$ | 13.35 |
| $C_{10}$ | 7.24 |
| $C_{11}$ | 3.76 |
| $C_{12}$ | 1.65 |
| $C_{13}$ | 0.71 |
| $C_{14}$ | 0.33 |
| $C_{15}$ | 0.14 |

The above data show that heptene-3 was effectively converted over a mixed catalyst bed system.

EXAMPLE III

Using samples of the same magnesium oxide and silica-tungsten oxide of Examples I and II, the vertical tubular steel reactor was packed with a bed of 3 parts by weight of the magnesium oxide (top) and a mixed catalytic bed containing 1 part by weight of the tungsten oxide-silica catalyst and 3 parts by weight of magnesium oxide (bottom). The entire catalytic section was then activated with flowing air and carbon monoxide as in Examples I and II.

Heptene-3 was then passed downwardly through the tubular reactor at a rate of 51.6 w./w./hr. at 700° F. and at atmospheric pressure. The conversion was 76 percent and the effluent upon analysis showed the hydrocarbon distribution in indicated amounts shown in Table III.

TABLE III

Heptene-3 conversion analysis

| Olefin component: | Weight percent |
|---|---|
| $C_2$ | Trace |
| $C_3$ | 0.32 |
| $C_4$ | 2.88 |
| $C_5$ | 9.66 |
| $C_6$ | 19.48 |
| $C_7$ | 24.27 |
| $C_8$ | 23.31 |
| $C_9$ | 11.66 |
| $C_{10}$ | 5.27 |
| $C_{11}$ | 2.00 |
| $C_{12}$ | 0.76 |
| $C_{13}$ | 0.24 |
| $C_{14}$ | 0.16 |

The above data show that heptene-3 was effectively converted with a combination of mixed bed and consecutive bed operation.

EXAMPLE IV

Pentene-2 was converted in a manner similar to those of the preceding examples. The pentene-2 was consecutively passed downwardly through a bed of magnesia which had been both air activated and CO treated and through a mixed bed containing both magnesia and the tungsten oxide-silica catalyst which also had been air activated and CO treated. For purposes of comparison, other runs were made in which the magnesia present in the catalytic section was only air activated and not included in the CO treatment. The conditions and results of these runs are shown in Table IV below.

TABLE IV.—PENTENE-2 CONVERSION

Condition 1.—MgO (4.56 g-Air activated) in top (first zone).[A mixture of $WO_3$—$SiO_2$ (0.93 g-Air activated, CO treated) and MgO (3.22 g-Air activated) in bottom (second) zone.]
Condition 2.—MgO (3.79 g-Air activated, CO treated) in top (first) zone. [A mixture of $WO_3$—$SiO_2$ (1.06 g-Air activated, CO treated) and MgO (2.95 g-Air activated, CO treated) in bottom (second) zone.]

| Run No. | 1 | 2 | 3 | 4 |
|---|---|---|---|---|
| Temp., °F | 800 | 850 | 800 | 850 |
| Pressure, p.s.i.g. | 100 | 100 | 100 | 100 |
| Parts by wt., feed | | | | |
| Parts by wt., catalyst/hr | 146 | 138 | 150 | 156 |
| Conversion, percent | 39.9 | 56.3 | 76.7 | 78.2 |
| Effluent olefin composition, wt. percent: | | | | |
| $C_2$ | 0.17 | 0.27 | 0.42 | 0.66 |
| $C_3$ | 3.59 | 4.98 | 7.01 | 10.46 |
| $C_4$ | 13.48 | 18.02 | 23.65 | 24.60 |
| $C_5$ | 60.10 | 43.70 | 23.30 | 21.80 |
| $C_6$ | 12.90 | 16.78 | 19.00 | 16.67 |
| $C_7$ | 6.45 | 9.52 | 12.92 | 11.91 |
| $C_8$ | 2.32 | 4.22 | 7.24 | 6.79 |
| $C_9$ | 0.71 | 1.65 | 3.57 | 3.74 |
| $C_{10}$ | 0.23 | 0.59 | 1.64 | 1.86 |
| $C_{11}$ | 0.07 | 0.22 | 0.70 | 0.95 |
| $C_{12}$ | | 0.07 | 0.31 | 0.40 |
| $C_{13}$ | | | 0.09 | 0.18 |
| $C_{14}$ | | | 0.05 | 0.07 |
| $C_{15}$ | | | 0.02 | 0.05 |
| $C_{16}$ | | | | 0.01 |

The above data show the increase in the level of conversion obtained according to the process of the invention.

EXAMPLE V

Butene-2 was converted over a catalyst system comprising a mixture of about 1 part by weight of $WO_3$—$SiO_2$ and about 5 parts by weight of MgO, and an additional 5 parts by weight of MgO as a layer on top of the mixture in the upstream position. The process was operated at 800° F., 300 p.s.i.g. and about 100 parts by weight of butene-2 per part by weight $WO_3$—$SiO_2$ per hour.

In run 1 the catalyst was cooled from 1000° F. to 800° F. following regeneration with $N_2$. In run 2 the catalyst was treated by cooling from 1000° F. to 800° F. following regeneration with butene-2 at a weight hourly space velocity of 100. In run 3 the catalyst was treated by cooling from 1000° F. to 800° F. following regeneration with butene-2 at a weight hourly space velocity of 200. The results are shown in Table V. In these runs and the runs of Examples I, II, III and IV, the analysis was by gas chromatography.

TABLE V

| | Butene-2 conversion, wt. percent after— | | | |
|---|---|---|---|---|
| Run No. | 1st hr. | 2nd hr. | 3rd hr. | 4th hr. |
| 1 | 30.8 | 43.6 | 49.1 | 50.5 |
| 2 | 61.5 | 62.8 | 63.1 | 62.8 |
| 3 | 60.8 | 60.9 | 60.8 | |

The above data show that butene-2 was converted to other olefins more effectively according to the process of the invention.

EXAMPLE VI

In this run cyclohexene and ethylene were continuously converted in a fixed bed reactor. The tubular steel reactor contained, as the catalytic bed, a mixture of 5 parts by weight of a silica-supported tungsten oxide catalyst (−20 +65 mesh) and 12 parts by weight of a magnesium oxide catalyst (−20 +50 mesh). This intimately mixed catalyst was charged into the center of the reactor with steel packing both above and below it. The catalyst bed was activated by heating to 1000° F. in the presence of flowing air for 3 hours. After the air treatment carbon monoxide was then passed over the catalyst for 10–15 minutes and the reactor was cooled to 700° F. under a carbon monoxide atmosphere.

A mixture of ethylene and cyclohexene was then passed through the reactor at 700° F., 400 p.s.i.g., and at a weight hourly space velocity of 13.5 w./w./hr., based upon the cyclohexene. The molar ratio of ethylene to cyclohexene was 7.6.

After being on stream for 1 hour to the reactor effluent was analyzed. The analysis showed that the conversion of reactants was about 45.7 percent with about 45.6 weight percent of the products being propylene, 19.9 weight percent being cyclopentene, 10.6 weight percent being butadiene, and small amounts of other hydrocarbons, principally mono- and diolefins, making up the remainder.

EXAMPLE VII

The run of Example VI was repeated under essentially the same conditions except that the reaction pressure was 750 p.s.i.g.

The feed stream for the reactor consisted of an 8.7 mole ratio of ethylene to cyclohexene (which had previously been percolated through a bed of silica gel and magnesia at room temperature). The conversion was carried out at 700° F., 750 p.s.i.g., and at a weight hourly space velocity of 11.8 w./w./hr.

After being on onstream for about 1 hour, the effluent from the reactor was analyzed. The analysis indicated a 35.3 percent conversion of cyclohexene with 55.0 weight percent of the products being propylene, 18.8 weight percent being cyclopentene, 12.4 weight percent being butadiene, about 2.6 weight percent believed to be 1,7-octadiene, and small amounts of other hydrocarbon products making up the remainder.

These runs illustrate that the process of the present invention is capable of converting cyclohexene to substantial amounts of cyclopentene and propylene.

EXAMPLE VIII

Ethylene and cyclopentene were continuously converted in a fixed bed reaction. The tubular steel reactor contained, as the catalytic bed, a mixture of 5 parts by weight of a silica/tungsten oxide catalyst (−20 +65 mesh) and 12 parts by weight of a magnesia catalyst (−20 +35 mesh). This intimately mixed catalyst was charged into the center of the reactor with steel packing both above and below it. The catalyst bed was activated by heating the reactor and catalyst bed to 1000° F. in the presence of flowing air for 3 hours. After the air treatment, carbon monoxide was passed over the catalyst for 10 minutes and the reactor was cooled to 700° F. under a carbon monoxide atmosphere.

The feed stream consisted of ethylene and cyclopentene (which had previously been percolated at room temperature through a silica gel and magnesia bed) having a mole ratio of 7.3. The conversion was carried out at 700° F., 400 p.s.i.g., and at a weight hourly space velocity of 11.7 w./w./hr. (based on the cyclopentene).

After being on stream for about 1 hour, the effluent from the reactor was analyzed. The analysis showed that about 20 percent of the reactants were converted, with about 50 percent of the products being propylene, about 25 percent of the products being butadiene, about 8.6 weight percent believed to be 1,6-heptadiene, and several other products believed to be butene-2, butene-1, and isobutylene.

These data show that cyclopentene can be effectively converted to butadiene and propylene in high ultimate yields by using the process of the present invention.

EXAMPLE IX

A tubular steel reactor was charged with a mixture of 3 parts by weight of silica/tungsten oxide catalyst (−20 +50 mesh) and 12 parts by weight magnesia (−20 +50 mesh) to form a catalytic bed. Steel packing was also charged into the reactor both below and above the bed. The catalyst bed was then activated by heating the reactor and bed at 1000° F. in flowing air for 3 hours followed by contact with flowing carbon monoxide for 10 minutes. The reactor was then cooled to 700° F. under a carbon monoxide atmosphere.

The feedstock for this run was a cat-cracked gasoline (800 parts by volume) which had been fractionated to remove the light ends boiling below 75° C. (200 parts by volume) and to leave behind the heavy ends boiling above 265° C. (75 parts by volume). This gasoline fraction was percolated through a bed of silica gel and magnesia at room temperature and then passed through the reactor together with sufficient ethylene to provide an 11.1 mole ratio of ethylene to the gasoline (having an estimated average molecular weight of about 126). The conversion was carried out at 400 p.s.i.g., 700° F., and at a weight hourly spaced velocity of 16.2 w./w./hr. based on the gasoline.

After being on stream for about 45 minutes, the effluent from the reactor was analyzed. The analysis indicated that about 20 percent of the gasoline fraction was converted. The major olefinic products obtained were propylene in an amount of 45.5 weight percent, and isobutene in an amount of 38.6 weight percent. Other C and C olefinic products were also observed. The analysis indicated that essentially all of the olefins originally present in the gasoline fraction were converted. Comparable runs carried out thermally or with only the magnesium oxide present gave only traces of the products obtained in the above run. This illustrates that a combination of the magnesium oxide and the silica/tungsten oxide improves the results obtained.

The data above show that the present invention can very effectively remove olefins from complex refinery streams by converting olefinic materials to other olefins such as propylene or isobutene which are easily separable from the refinery stream.

EXAMPLE X

A fixed bed catalytic reactor was charged with 4.0 g. activated MgO immediately upstream of 3.0 g. of a silica-supported tungsten oxide catalyst (containing 6.8 weight percent tungsten oxide, having a surface area of about 345 m./g., a pore volume of 0.98 ml./g., pore diameter of 114 Angstroms, and having a mesh size of 30–50). While in the reactor the consecutive catalyst beds were heated in flowing air for 2½ hours at 1000° F. They were then flushed with nitrogen and contacted with a stream of NO for 30 minutes at 1000° F. The beds were again flushed with nitrogen, cooled to about 700° F., and contacted with a flow of heptene-3 (pretreated with silica gel and MgO) at a weight hourly space velocity of 51.6 and at atmospheric pressure. After 15 minutes the temperature was raised to 800° F. and the effluent from the reactor was sampled.

Analysis of the effluent by gas-liquid chromatography showed that the heptene-3 was 61.8 percent converted and the products contained only 0.57 mol percent branched by-products. The reaction products were olefins of the following composition in mol percent.

TABLE VI

| Olefin component: | Mol percent |
|---|---|
| $C_4$ | 3.98 |
| $C_5$ | 13.56 |
| $C_6$ | 37.67 |
| $C_7$ | Feed |
| $C_8$ | 25.71 |
| $C_9$ | 12.47 |
| $C_{10}$ | 4.38 |
| $C_{11}$ | 1.56 |
| $C_{12}$ | 0.51 |
| $C_{13}$ | 0.13 |
| | 99.97 |

The conversion level and selectivity of this run is superior to comparable runs carried out without the NO treatment.

What is claimed is:

1. In the olefin reaction process wherein at least one olefin hydrocarbon selected from the group consisting of acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof, mixtures of the above olefins, and mixtures of ethylene with one or more of the above olefins; is contacted with a catalyst system selected from the group consisting of (1) magnesium oxide admixed with a catalyst active for disproportionating propylene into ethylene and butene and (2) consecutive beds of magnesium oxide and a catalyst active for disproportionating propylene into ethylene and butene, wherein the amount of the magnesium oxide is equal to at least 0.1 part by weight per part by weight of the component active for disproportionating propylene, under conditions of temperature, pressure and contact time to produce products of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, the improvement comprising modifying catalyst system activity by contacting said magnesium oxide with a treating agent selected from the group consisting of carbon monoxide, nitric oxide and hydrogen at a temperature of about 800 to 1400° F. for about 1 minute to 30 hours prior to contact with said olefin hydrocarbon, wherein the reaction conditions include a temperature in the range of 0 to 1100° F. which is selected within the range for which the selected disproportionation component is active for promoting the olefin reaction.

2. The process of claim 1 wherein the catalyst active for disproportionating propylene into ethylene and butene is selected from the group consisting of silica, alumina, silica-alumina, magnesia-titania, aluminum phosphate, zirconium phosphate, and an alkaline earth metal phosphate, promoted with a compound selected from the group consisting of oxides of molybdenum, tungsten, rhenium and tellurium; hexacarbonyls and sulfides of tungsten and molybdenum; the ammonium salt, alkaline earth metal salt, and bismuth salt of phosphomolybdic acid; magnesium tungstate and beryllium phosphotungstate.

3. The process of claim 2 wherein the catalyst comprises silica promoted with tungsten oxide and said conditions of temperature are selected within the range of 400 to 1100° F.

4. The process of claim 1 wherein the olefin hydrocarbon is an acyclic monoene.

5. The method of claim 1 wherein a double bond isomerizable cyclic monoolefin having from 6 to about 20 ring carbon atoms and ethylene are reacted and the product comprises a cyclic monoolefin having at least one less carbon atom than the ring in the original starting material.

6. The method of claim 5 wherein cyclohexene and ethylene are reacted and the product comprises cyclopentene and propylene.

7. The method of claim 1 wherein ethylene is reacted with acyclic monoolefins to produce lower molecular weight olefins.

8. The process of claim 1 wherein said magnesium oxide has been treated with carbon monoxide.

9. The process of claim 3 wherein said magnesium oxide has been treated with carbon monoxide.

10. The process of claim 1 wherein said catalyst active for disproportionating propylene into ethylene and butene and said magnesium oxide are in admixture.

11. The process of claim 2 wherein the catalyst active for disproportionating propylene into ethylene and butene is silica promoted with tungsten oxide.

References Cited

UNITED STATES PATENTS

| | | | |
|---|---|---|---|
| 2,361,613 | 10/1944 | Drennan | 260—683.2 |
| 3,261,879 | 7/1966 | Banks | 260—683 |
| 3,365,513 | 1/1968 | Heckelsberg | 260—683 |
| 3,457,320 | 7/1969 | Stapp et al. | 260—683 D |
| 2,333,903 | 11/1943 | Thomas | 260—666 A |
| 2,728,802 | 12/1955 | Closson | 260—666 A |
| 2,500,146 | 3/1950 | Fleck | 260—673.5 |
| 2,834,823 | 5/1958 | Patton | 260—683.65 |
| 2,968,612 | 1/1961 | Loughran | 208—136 |
| 3,083,246 | 3/1963 | Holzman | 260—683.15 |
| 3,340,322 | 9/1967 | Heckelsberg | 260—683 |
| 3,395,196 | 7/1968 | Heckelsberg | 260—666 A |

DELBERT E. GANTZ, Primary Examiner

V. O'KEEFE, Assistant Examiner

U.S. Cl. X.R.

260—683 D